(12) United States Patent
Corwin et al.

(10) Patent No.: US 11,381,473 B1
(45) Date of Patent: Jul. 5, 2022

(54) GENERATING RESOURCES IN A SECURED NETWORK

(71) Applicant: Amazon Technologies, Inc., Seattle, WA (US)

(72) Inventors: Sage Corwin, Arlington, VA (US); Fahad Zafar, Potomac, MD (US); Austin Reynolds, Herndon, VA (US); Josh Drenan, Reston, VA (US); Shawn Sanavullah, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/021,921

(22) Filed: Sep. 15, 2020

(51) Int. Cl.
*H04L 41/22* (2022.01)
*H04L 41/28* (2022.01)
*H04L 47/70* (2022.01)
*H04L 41/12* (2022.01)

(52) U.S. Cl.
CPC ............. *H04L 41/22* (2013.01); *H04L 41/12* (2013.01); *H04L 41/28* (2013.01); *H04L 47/70* (2013.01)

(58) Field of Classification Search
CPC ......... H04L 41/12; H04L 41/22; H04L 41/28; H04L 47/70
See application file for complete search history.

(56) References Cited

U.S. PATENT DOCUMENTS

| | | | |
|---|---|---|---|
| 9,438,599 B1* | 9/2016 | Yuhan | H04L 63/108 |
| 9,756,050 B1* | 9/2017 | Brandwine | H04L 63/102 |
| 10,530,742 B2* | 1/2020 | Shah | G06F 9/455 |
| 11,029,977 B2* | 6/2021 | Baneva | G06F 9/451 |
| 2005/0080801 A1* | 4/2005 | Kothandaraman | H04L 67/02 |
| 2011/0225217 A1* | 9/2011 | Plax | G06F 16/2282 707/825 |
| 2020/0059420 A1* | 2/2020 | Abraham | H04L 41/0843 |

OTHER PUBLICATIONS

Novell. "Identity Manager Roles Based Provisioning Module 3.6.1 User Application: Administrator Guide" (excerpt), pp. 1-38. (Year: 2016).*

* cited by examiner

*Primary Examiner* — John M MacIlwinen
(74) *Attorney, Agent, or Firm* — Lee & Hayes, P.C.

(57) ABSTRACT

Technologies are disclosed for generating resources within a secured network. When a user from an outside network wants to perform actions involving resources of a secured network, the user simply indicates the actions to perform within a resource file. Upon specifying the actions to perform, the requested actions specified in the resource file are securely transferred to the secured network where a cleared user of the secured network may approve/reject the actions to perform. In some cases, the cleared user may view the actions within a graphical user interface (GUI) and approve/reject the requested actions. The approved actions are then executed within the secured network. Results obtained from executing the approved actions are transferred to the user of the outside network without the user having to message, or call, the cleared user of the secured network.

20 Claims, 9 Drawing Sheets

GENERATING RESOURCES IN A SECURED NETWORK

BACKGROUND

Making changes to resources within a secured network can be very challenging. For example, in some secured networks it may be difficult to move data from an outside network to the secured network. In some instances, an authorized user may need to approve the data to be moved to the secured network. In addition to challenges moving data from an outside network to the secured network, it can be very challenging to perform actions within the secured network. For example, to create a resource within a secured network, a user who is not cleared (e.g., authorized/privileged) to make a change to the secured network has to wait for an authorized user to attempt to make the change within the secured network. If there is a problem with the change, the entire process of submitting the data and waiting for the authorized user to attempt the change is repeated. Making this process take even longer is that in many cases very few users are authorized to make changes to a secured network. As an example, there may be hundreds of users desiring to make changes to resources within a secured network, such as an air-gapped network, but only a few users that are authorized to make changes. As such, it may be very time-consuming making changes to resources within a secured network.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
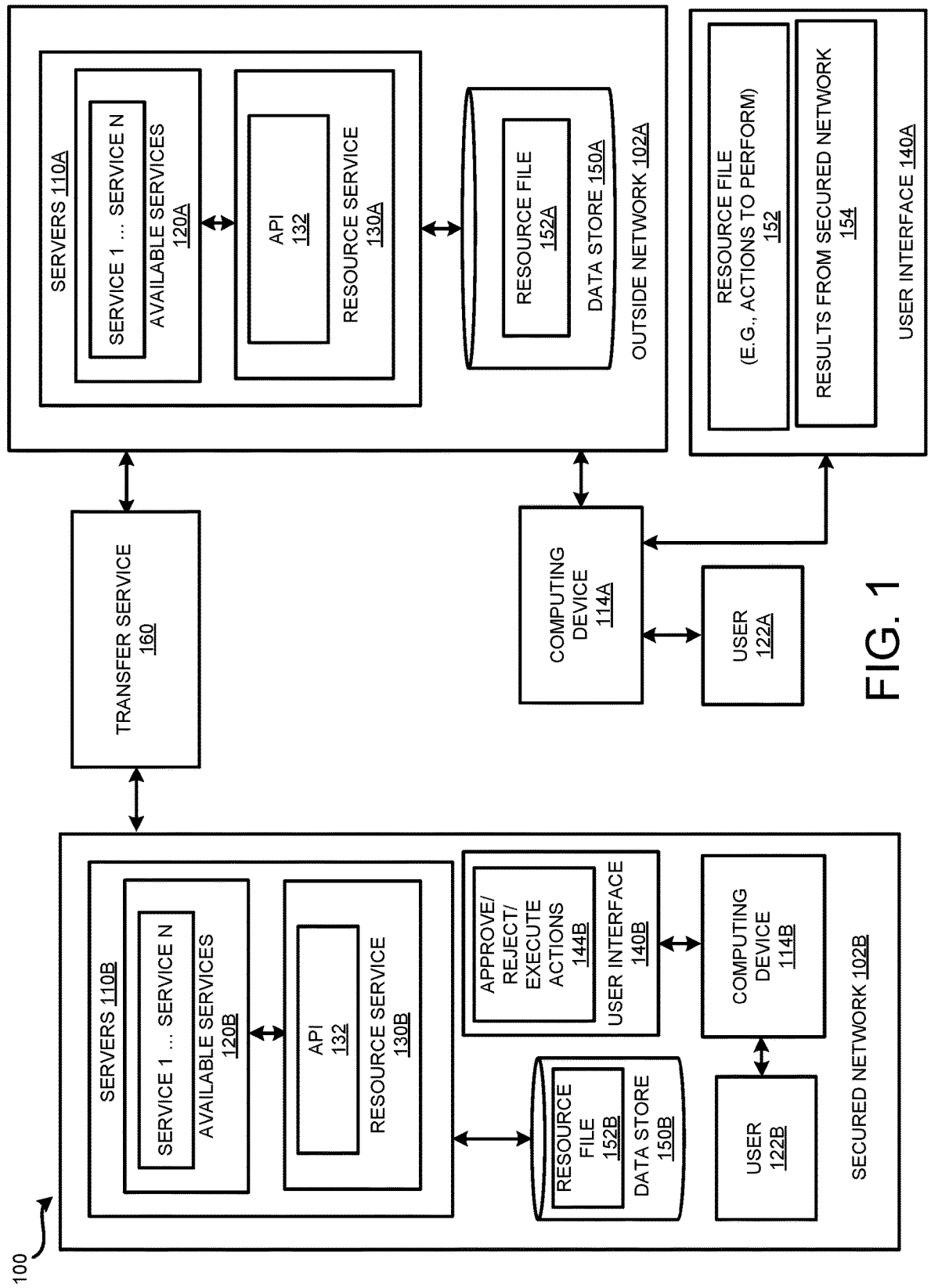
FIG. 1 is a software and network architecture diagram showing aspects of the configuration and utilization of an environment for generating resources within a secured network.

The following detailed description is directed to technologies for generating resources in a secured network. As used herein, a "secured network" is a network such as an "air-gapped" network that is secured and isolated from other networks. A secured network may be physically isolated from unsecured networks, such as the public Internet or other networks that are outside of the secured network, which may be referred to herein as an "outside network". A secured network may be used for a variety of purposes, such as military or government networks, financial networks (e.g., stock exchanges), hospital networks, industrial control systems (e.g., oil field networks), and the like. In some examples, a secured network may have a data store that is accessible via a network that is outside of the secured network, which may be referred to herein as an "outside network".

Utilizing technologies described herein, a resource service is configured to automate steps to perform actions in a secured network requested by a user that is not authorized to perform actions in the secured network. In some examples, with limited intervention by a "cleared user", the resource service generates resources in the secured network and provides results back to the user in the outside network. As used herein, a "cleared user" is a user that is authorized and/or privileged to perform actions, such as generating resources, within the secured network.

As an example, a user of an outside network may want to create storage resources within the secured network. Instead of having to message or call the cleared user to create the storage resources which may take a long time, a resource service provides the requested actions to generate the storage resources to the secured network, requests authorization from the cleared user to perform the actions (e.g., via a GUI presented to the cleared user, executes the actions to generate the storage resources, and then automatically provides results (e.g., whether the storage resources were successfully created) to the user of the outside network.

In this way, using the resource service to generate resources in the secured network removes many steps that may be time consuming, error prone, and involve many communications between the user from the outside network and the cleared user. Additionally, computing resources of the secured network and the outside network are more efficiently used as processing may be eliminated or reduced due at least in part to the reduction of steps to generate resources in the secured network. The resources generated and/or used to perform actions may be many different types of resources such as, but not limited to data processing resources, such as virtual machine ("VM") instances, data storage resources, networking resources, data communication resources, network services, and the like.

Using the techniques described herein, in some examples a user creates a resource file that defines what actions to perform within a network. The resource file may include actions/commands to create resources (e.g., disk storage, virtual machines, . . . ) within a network, change parameters of one or more resources, test an operation of one or more resources, query one or more resources, and the like. A resource file may include/reference source code, actions to perform, what network to perform the actions in, and the like. According to some examples, when a user from an outside network wants to perform actions involving resources of a secured network, the user indicates that the name of the secured network within the resource file (or at some other location). Before the actions are performed, a resource service identifies that the actions are to be performed within a secured network by identifying that the specified network is a secured network.

This reduces the need for the user of the outside network to contact the cleared user to request operations to be performed within the secured network. After the resource service determines that the actions are to be performed within the secured network, the resource service automates the steps to perform actions within the secured network. In some examples, the resource service stores the resource file within a data store that is accessible by the secured network. Upon the resource file being stored, a transfer service configured to securely transfer data between the outside network and the secured network stores the resource file within a data store of the secured network. According to some examples, before storing the resource file within the secured network data store, a cleared user may authorize the storage of the resource file. For instance, upon the event of storing the resource file within the outside network data store, a notification can be provided to a cleared user requesting authorization to perform actions, such as storing data and/or performing actions, within the secured network.

In some examples, the notification can include a summary of the requested actions to be performed and a selectable link that may provide more details within a user interface (UI). The cleared user may select the link to access the UI, or some other mechanism, to approve/reject the requested actions. In some examples, the cleared user may indicate within a graphical user interface (GUI) whether to approve or reject each of the requested actions. The cleared user may then execute the approved actions within the secured network. In some configurations, the cleared user enters authentication credentials before executing the approved actions.

Instead of the cleared user having to communicate directly with the low side user to convey whether the actions were successfully executed, the resource service within the secured network may generate results that are provided to one or more users of the outside network. For instance, the results service may cause the results to be transferred to an outside data store of the outside network. Upon receiving the results from the secured network, the resource service may provide a notification to the user(s) indicating that the results are ready for review. In some configurations, the user(s) may view the results using a UI, such as a GUI. As such, instead of a user from an outside network having to communicate extensively with a cleared user of a secured network, the user may request actions to be performed within the secured network and receive results from the secured network with minimal to no direct interaction with the cleared user.

As will be described in more detail below, instead of communicating extensively with a cleared user, and possibly having to wait a long period of time for the cleared user to become available to coordinate actions with the user of the outside network, the resource service automates many of the steps in authorizing actions, performing the actions, and providing results to the user of the outside network. Additional details regarding the various components and processes described briefly above for generating resources within a secured network will be presented below with regard to FIGS. 1-8.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can also be practiced in distributed computing environments, where tasks can be performed by remote computing devices that are linked through a communications network. In a distributed computing environment, program modules can be located in both local and remote storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the configuration and utilization of an environment 100 for generating resources within a secured network. It is to be appreciated that the environment 100 is merely illustrative and that the various configurations disclosed herein can be utilized in many different types of computing environments.

To provide a resource service 130 and the other functionality disclosed herein, one or more networks 102 may include one or more servers 110 that include 110A and 110B. In some examples, the combination of the outside network 102A and the secured network 102B may be referred to herein as "the networks 102". The servers 110 can execute software components to provide the services described herein, including the resource service(s) 130, such as resource service 130A and resource service 130B, functionality and different available services 120 provided by a service provider and/or some other entity. The software components can execute on a single server 110 or in parallel across multiple servers in the networks 102. In addition, a software component can consist of subcomponents executing on different servers 110 or other computing devices in the networks 102. Various components can be implemented as software, hardware, or any combination of the two. In this regard, it is to be appreciated that the networks 102 shown in FIG. 1 has been simplified for discussion purposes and that many additional software and hardware components can be utilized.

A user 122A of the outside network 102A can utilize the resource service 130A, via a computing device 114A or some other input device. A user 122B of the secured network 102B can utilize the resource service 130B, via a computing device 114B, or some other input device. According to some configurations, the computing devices 114 may be configured to understand natural language voice commands and complete tasks for the user, such as tasks related to replication as described herein. As illustrated, a user 122 may interact with the resource service 130 through a user interface 140. In some examples, the user 122A is a user of the outside network 102A, and the user 122B is a cleared user that is authorized to perform actions within the secured network 102B.

The computing device 114 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, a telephone, a telephone conferencing device, video conferencing device, or any other type of computing device capable of connecting to the outside network 102A and in some examples, the secured network 102B. In other configurations, the computing device 114 may be configured to communicate with one or more other devices to receive commands from users and/or perform processing related to functionality of the outside network 102A and/or the secured network 102B.

As illustrated, the computing device 114, or some other device or component, may couple with a network, such as outside network 102A or secured network 102B. A network represents an array or wired networks, wireless networks (e.g., Wi-Fi), or combinations thereof. A network may generally refer to a network-accessible platform implemented as a computing infrastructure of processors, storage, software, data access, and so forth. In some examples, a network may be accessible via a network, such as the Internet. These services may not require end-user knowledge of the physical location and configuration of the system that delivers the services. Common expressions associated with these remote services, such as the outside network 102B, include "on-demand computing", "software as a service (SaaS)", "platform computing", "network accessible platform", and so forth.

As illustrated, the outside network 102A and the secured network 102B may comprise one or more network-accessible resources, such as servers 110A and servers 110B. These resources comprise one or more processors and computer-readable storage media executable on the processors. In some configurations, the users 122 may be identified and/or authenticated before interacting with the computing device 114 that is associated with one of the networks 102.

In some examples, a local-area network ("LAN"), a wide-area network ("WAN"), the Internet, or any other networking topology known in the art may connect user devices to a network. The user 122 can use an application (not shown) executing on computing device 114 that provides user interface 140 to access and utilize the resource service functionality provided by the servers 110. In some examples, the application is a web browser application (not shown). Generally, a web browser application exchanges data with the servers 110 in the networks 102 using the hypertext transfer protocol ("HTTP") over one or more of the networks 102. The application might also be a stand-alone client application configured for communicating with the servers 110.

The application can also utilize any number of communication methods known in the art to communicate with one or more of the networks 102 and/or the servers 110, including remote procedure calls, SOAP-based web services, remote file access, proprietary client-server architectures, and the like. According to some configurations, the application may provide a user interface 140 that can be utilized by the user 122 to configure settings associated with the resource service 130 and/or the computing device 114. Typically, a user 122 interacts with the computing device 114 using the user interface 140.

As discussed briefly above, one or more resource services 130, such as resource service 130A and resource service 130B which may be referred to herein as "resource services 130", are configured to automate generating resources in the secured network 102B that are requested by a user 122A from the outside network 102A. In some examples, a user, such as user 122A, may utilize the outside network 102A to generate the actions to perform within the secured network 102B and receive results from the secured network 102B. For instance, the user 122A may view data, determine actions to perform, and the like via a user interface, such as user interface 140A. In some examples, the resource service 130A provides to a user computing device 114A data for display within user interface 140A, such as a graphical user interface ("GUI"). The GUI may display information relating to generating the resource file 152A and/or reviewing results obtained from the secured network 154. In some examples, the UI 140A may also utilize one or more services/components provided by a third party that is not part of the service provider network.

The user 122B, may utilize the secured network 102B to approve/reject the requested actions to perform within the secured network 102B. For instance, the user 122B may approve/reject the requested actions via a user interface, such as user interface 140B. The requested actions may be a variety of actions, such as but not limited to generating resources (e.g., disk storage, virtual machines, . . . ) within the secured network 102B, change parameters of one or more resources within the secured network 102B, test an operation of one or more resources within the secured network 102B, query one or more resources within the secured network 102B, and the like. According to some configurations, the cleared user 122B selects a UI element to approve a requested action and leaves unselected a UI element to not approve a requested action. In some examples, the resource service 130B provides to a user computing device 114B data for display within user interface 140B, such as a graphical user interface ("GUI"). In some examples, one or more of the requested actions by the user 122A may be automatically authorized/approved by the user 122B. For instance, the user 122B may have preauthorized one or more actions to be performed within the secured network.

As briefly discussed above, the user 122A may be a user that is authorized to perform actions within the outside network 102A but that is not authorized to perform actions within the secured network 102B. To perform actions within the secured network, the user 122A needs approval from a cleared user, such as user 122B.

According to examples disclosed herein, the resource service 130A is configured to automate the process of generating resources within the secured network 102B. In some configurations, the user 122A defines the resources to generate and generates a resource file 152A that defines what actions to perform within a network, such as the secured network 102B. The resource file 152A may include actions/commands to create resources (e.g., disk storage, virtual machines, . . . ) within the secured network 102B, change parameters of one or more resources within the secured network 102B, test an operation of one or more resources within the secured network 102B, query one or more resources of the secured network 102B, and the like. In some examples, the resource file 152A and 152B is a JavaScript Object Notation (JSON) file. Generally, JSON is "selfdescribing" and an easy to understand format. The resource file 152A and 152B may include/reference source code, actions to perform, what network to perform the actions in, and the like. In some examples, when the user 122B indicates to generate the resources in a secured network 102B (e.g., by specifying the secured network 102B within the resource file 152A, or providing some other indication), the resource service 130A performs actions that reduce communications between the user 122A and the cleared user 122B.

In some examples, the user 122A instructs the resource service 130A to generate resources within the secured network 102B. In some configurations, the creation of the resource file 152A is a triggering event that causes the resource manager 130A to start a process to provide the resource file 152A to the secured network 102B. As used herein, a "triggering event" is an occurrence of one or more specified events. For example, a triggering event may be identified from an occurrence of one or more conditions within the service provider network (e.g., creation of the resource file, results obtained from the secured network, a communication from the secured network, storage of the resource file in a data store accessible by the secured network, and the like).

When a triggering event is detected that indicates the occurrence of an event, the resource service 130 may identify and send a message to individuals that are associated with the event. For instance, when a request is made to perform actions within the secured network 102B, one or more cleared users 122B may be notified of the request. Similarly, when the cleared user 122B has performed the requested actions and results are available, a user 122A within the outside network may be notified of the availability of the results. In other examples, the triggering event may cause actions to take place within the secured network (e.g., approve/deny requested actions, execute approved actions, cause results to be made available to the outside network, and the like). A triggering event may also cause actions to take place within the outside network (e.g., store the resource file within a data store accessible by the secured network, access the results and provide to a user within the outside network, and the like).

In some configurations, the resource service 130A stores the resource file 152A within data store 150A. In response to the resource file 152A being stored in the data store 150A, an event is generated that triggers the transfer service 160 to securely transfer the resource file 152A to the data store 150 of the secured network 102B. According to some examples, before the transfer service 160 causes the resource file 152A to be stored within the secured network data store 150 as resource file 152B, a cleared user of the secured network, such as user 122B, may authorize the storage of the resource file 152B. For instance, upon the event of storing the resource file 152A within the outside network data store 150A, the resource service 130A, the transfer service 160, or some other device or component, may transmit a notification to the cleared user 122B that requests authorization to perform actions within the secured network 102B.

According to some configurations, the transfer service 160 may modify one or more of the requested actions such that the requested actions execute within the secured network 102B. For example, the secured network 102B may use different mechanisms to execute a requested action (e.g., creation of a storage resource, processing resource, and the like). As an example, the transfer service 160 may change a requested action for a particular type of resource that is not available within the secured network 102B to a type of resource that is available within the secured network 102B and is compatible with the requested action.

In some examples, the notification can include a summary of the requested actions to be performed and a selectable link that may provide more details within a user interface (UI). The cleared user 122B may select the link to access the UI 140B, or some other mechanism, to approve/reject the requested actions. In some examples, the cleared user 122B may indicate within a graphical user interface (GUI), such as illustrated in FIG. 3B, whether to approve or reject each of the requested actions. The cleared user 122B may then execute the approved actions within the secured network 102B. In some configurations, the cleared user 122B enters authentication credentials before the approved actions are executed within the secured network 102B.

In some examples, the resource service 130B executes the approved actions to generate the resources and stores results within a memory, such as data store 150B. After executing the approved actions, the resource service 130B may cause the results to be transferred to an outside data store of the outside network. Upon receiving the results from the secured network 154 to be provided to the user 122A of the outside network.

In some examples, the resource service 130 may provide a notification to the user 122A indicating that the results are ready for review. According to some configurations, the user 122A may view the results using a UI 140A, such as a GUI.

According to some examples, the resource service 130 may expose an Application Programming Interface (API) 132. In some configurations, functionality provided by the resource service 130 may be accessed using the incident API 132 that may be a Web API. The API 132 might be used to request data from one or more data stores such as data store 150, services 120, and/or other applications, and the like. Some exemplary APIs include but are not limited to obtaining a status of requested actions to perform within a secured network 102B, obtaining results from the secured network 102B, obtaining an identification of unapproved requests, approved requests, generate requests to perform actions, indicating data to be made available to the secured network 102B, and the like.

In some configurations, the resource service 130 may access other available services 120 to obtain data that may be used by the resource service 130. For example, the resource service 130 may be a notification service (See FIG. 2 and related discussion). Additional details regarding the various processes described above with regard to FIG. 1 will be provided below with regard to FIGS. 2-8.

Figure 2:
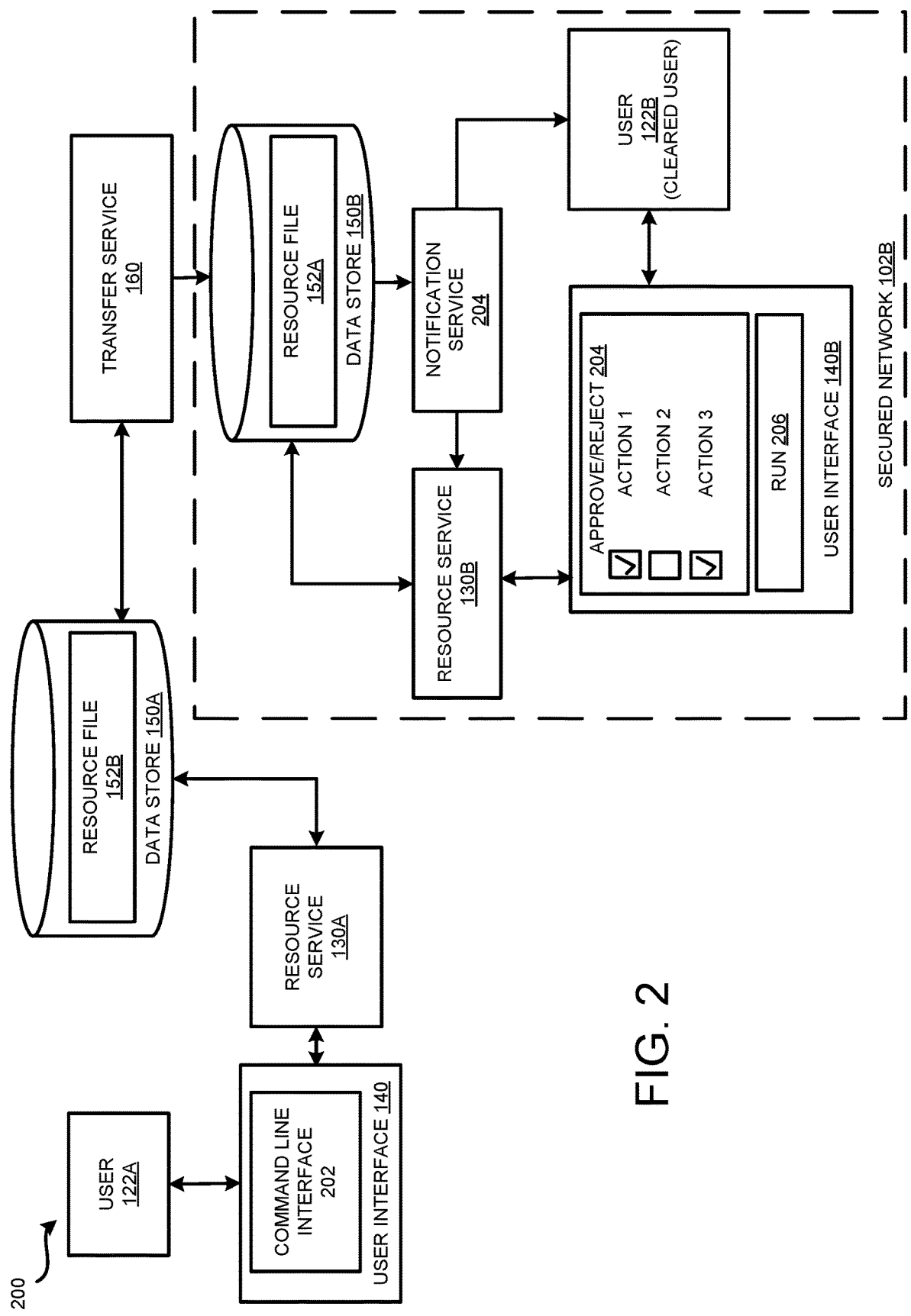
FIG. 2 is a software and network architecture diagram showing aspects of a resource service that automates the process of performing actions within a secured network.

FIG. 2 is a software and network architecture diagram showing aspects of a resource service 130 that automates the process of performing actions within a secured network 102B. It is to be appreciated that the environment 200 is merely illustrative and that the various configurations disclosed herein can be utilized in many different types of computing environments. FIG. 2 is similar to FIG. 1 but provides additional details.

As illustrated, environment 200 shows a user 122A that is requesting to perform actions within a secured network 102B as indicated by the dashed line. In the illustrated example, the user 122A is using a command line interface 202 of UI 140 to create and generate a resource file 152A. In some configurations, the user 122A may utilize the resource service 130A to generate the resource file 152A. For instance, the user 122A may provide one or more files to the resource service 130A via the UI 140 that are used to generate the resource file 152A. The resource service 130A may communicate with one or more other services 120 using one or more Application Programming Interfaces (APIs), such as API 132 exposed by the resource service 130. In some examples, each service may expose one or more APIs (not shown) that can be used by a service, or some other component or application, to access functionality and/or data provided by the service.

In some examples, the transfer service 160, or some other service, monitors for a triggering event to determine when to transfer data to/from the secured network 102B. For example, when the resource file 152A is stored within data store 150A and it is determined that actions are requested to be performed within the secured network 102B by the user 122A, then the transfer service 160 may transfer the resource file 152A to store as resource file 152B within the data store 150B when authorized. According to some examples, a service, component, or device may monitor for an occurrence of a specified triggering event. For example, a storage service may monitor for creation of a resource file 152A within data store 150A. Upon detecting the resource file 152A being stored within the data store 150B, or in response to some other event, the resource service 130B may utilize notification service 204 to transmit a message to the cleared user 122B to approve/reject requested actions. In some examples, the notification includes a link that when selected provide UI 140B for presentation to the user 122B that includes approve/reject UI elements 204, and a run UI element 206. As will be described in more detail with regard to FIG. 3B, the cleared user 122B may simply select (as indicated by a check mark) an action to approve execution of the action within the secured network 102B. In some configurations, when an action is not selected, then that action is rejected and will not be approved to execute within the secured network 102B. Other UI elements may be utilized to approve/reject actions.

Figure 3A:
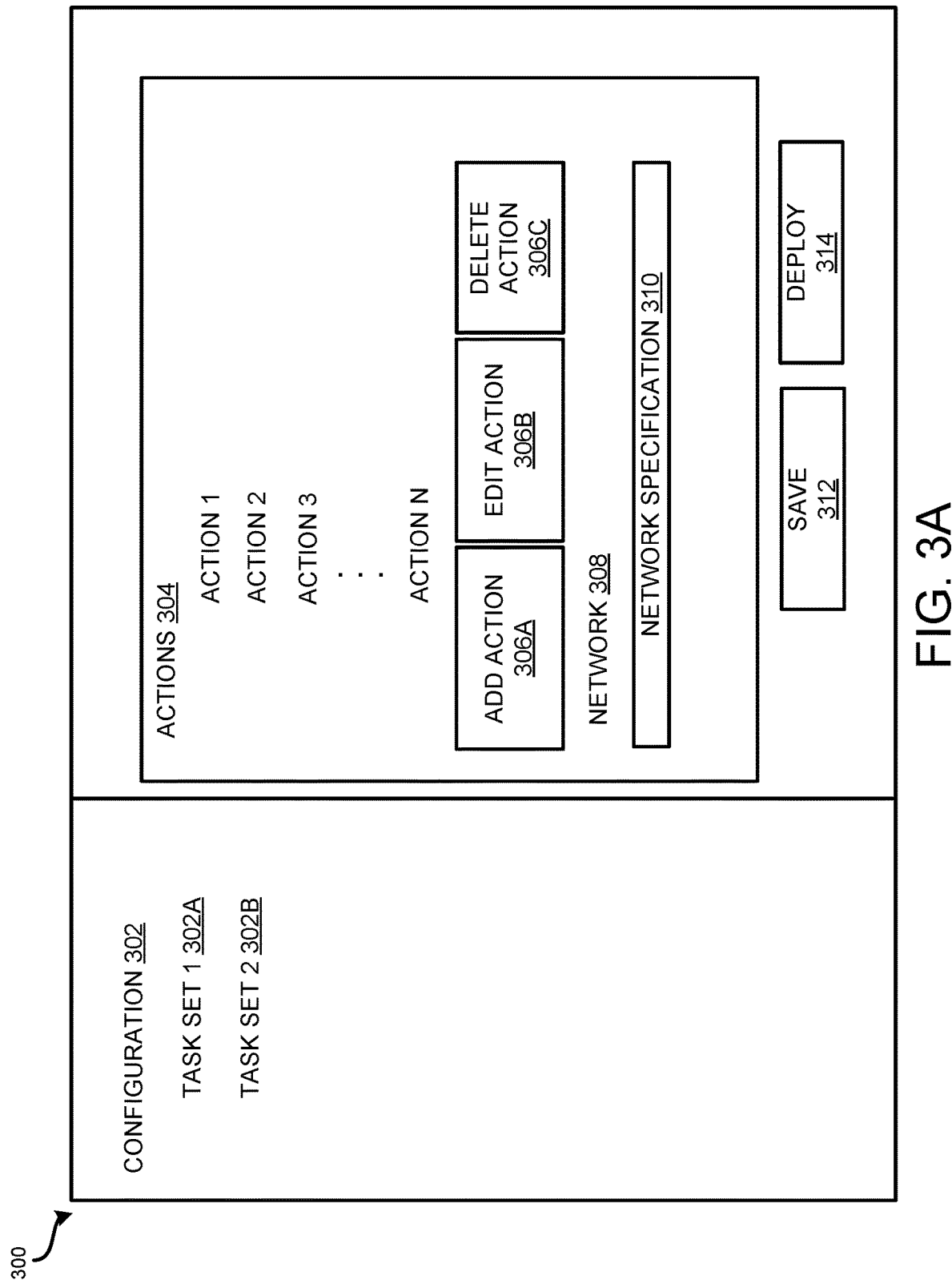
FIG. 3A is a block diagram showing an illustrative graphical user interface that may be utilized to specify actions to perform within a secured network.
Figure 3B:
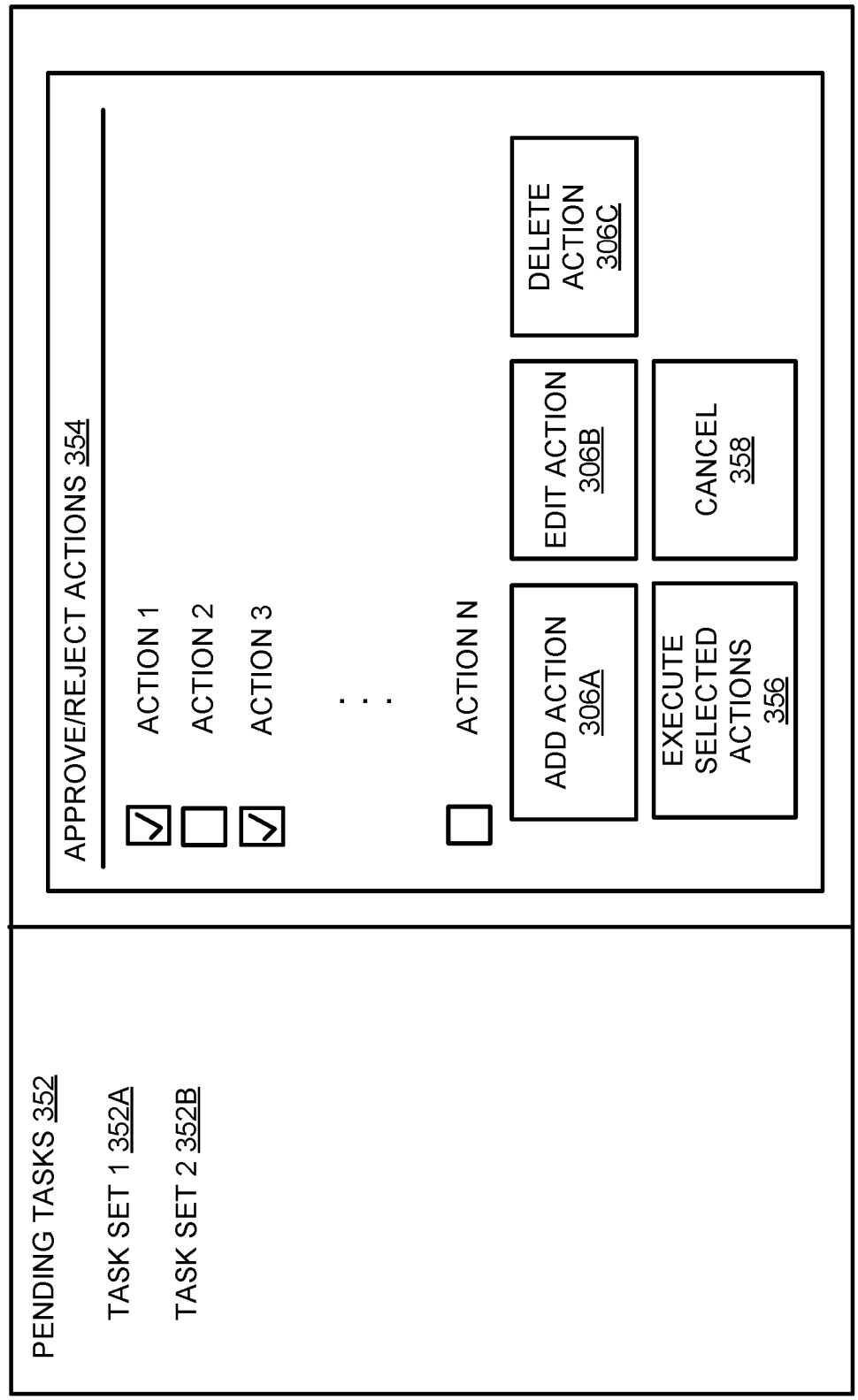
FIG. 3B is a block diagram showing an illustrative graphical user interface that may be utilized by a cleared user associated with a secured network to approve/reject actions requested to be performed within the secured network by a user from an outside network.

FIG. 3A is a block diagram showing an illustrative graphical user interface 300 that may be utilized to specify actions to perform within a secured network. In some examples, the user 122A specifies actions 304 that includes commands, such as commands 1-N, to execute within a network via a graphical user interface (GUI). In other examples, the user may use a command line interface, or utilize an Application Programming Interface (API). In some instances, the resource service 130 may provide data for displaying a GUI to a display associated with a user computing device (not shown).

In the example illustrated in FIG. 3A, GUI 300 shows user interface (UI) elements related to configuring actions to perform within a network, such as an outside network 102A and/or a secured network 102B. More or fewer UI elements may be included within GUI 300. As illustrated, the GUI 300 includes configuration UI element 302 that allows a user 122 to configure task sets 302 that include one or more actions 304 to perform. The GUI 300 also shows a network name UI element 308 to specify the network in which the actions are to be performed. As discussed above, the network may be the name of a secured network 102B and/or the name of an outside network 102A. According to some configurations, when the user 122A specifies the name of a secured network, and the user 122 selects the deploy UI element 314, then a resource file is generated and made available to the secured network as discussed above.

In the current example, the add action UI element 306A may be selected by the user 122 to add an action to the current task set 302. For example, upon selecting the add action UI element 306A, the user 122 may enter a new action by selecting an action from available actions, entering a name of the action within a text box, or using some other mechanism. The user 122 may edit one or more of the actions by selecting the edit action UI element 306B. For example, the user 122 may select the edit action UE element 306B and then highlight one of the actions within the GUI 300 to change the selected action. The user 122 may delete one or more of the actions 304 using delete action UI element 308C. For example, the user 122 may select the delete action UE element 306C and then highlight one of the actions within the GUI 300 to delete. The user 122 may save the task set 302 by selecting the save UI element 312. In some examples, selecting the save UI element 312 saves the actions within a resource file 152A within the data store 150A.

FIG. 3B is a block diagram showing an illustrative graphical user interface that may be utilized by a cleared user 122B associated with a secured network to approve/reject actions requested to be performed within the secured network by a user from an outside network. As discussed above, the user 122B is authorized to perform actions within the secured network.

In the example illustrated in FIG. 3B, GUI 350 shows user interface (UI) elements related to approving and/or rejecting actions. As discussed above, in some examples, the actions related to creating resources within a secured network (e.g., adding data storage, configuring a virtual computing resource, . . . ). More or fewer UI elements may be included within GUI 350.

As illustrated, the GUI 350 UI elements include a pending tasks 352 UI element that when selected shows task sets 352 awaiting action from a cleared user of the secured network. In the current example, the cleared user 122B has selected task set 2 UI element 352B to view. In response to selecting the task set 2 UI element 352B, the display of the approve/reject actions 354 is displayed to the cleared user 122B. As illustrated, the cleared user 122B may select actions to approve (as indicated by a checkmark) and actions that are not selected are rejected.

Other UI elements may be used to approve/reject actions. For example, in some configurations, a cleared user 122B may add/edit/delete one or more actions submitted by the user 122A. For example, the add action UI element 306A may be selected by the user 122B to add an action to the current task set 302. For example, upon selecting the add action UI element 306A, the user 122B may enter a new action by selecting an action from available actions, entering a name of the action within a text box, or using some other mechanism. The user 122B may edit one or more of the actions by selecting the edit action UI element 306B. For example, the user 122B may select the edit action UE element 306B and then highlight one of the actions within the GUI 300 to change the selected action. The user 122 may delete one or more of the actions 304 using delete action UI element 308C. For example, the user 122 may select the delete action UE element 306C and then highlight one of the actions within the GUI 350 to delete.

After selecting actions to approve (if any), and performing any additions/edits/deletions, the cleared user 122B may execute the actions within the secured network by selecting the execute UE element 356. The cleared user 122B may select the cancel UI element 358 if no action is to be taken at this time.

Figure 4:
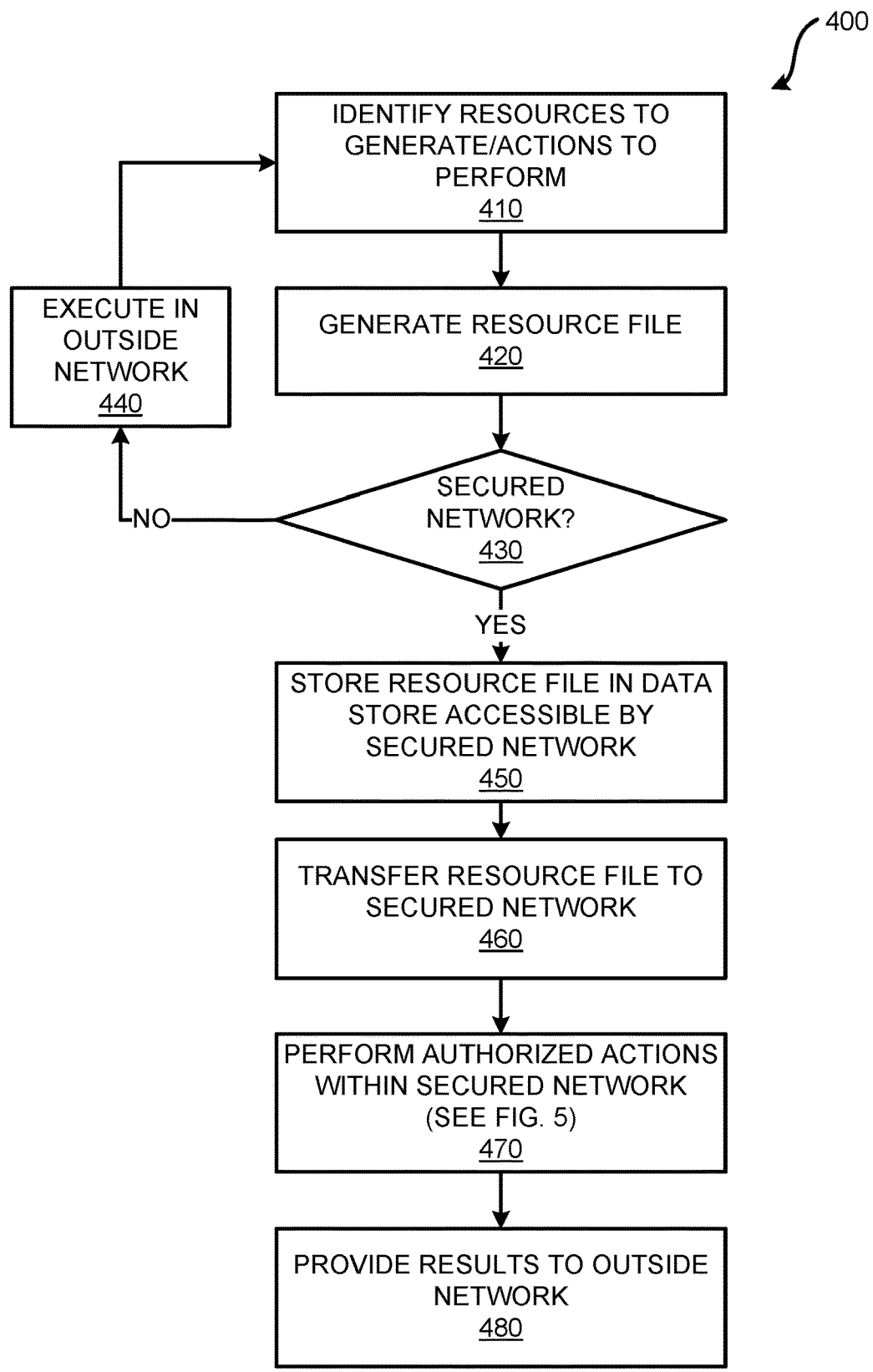
FIG. 4 is a flow diagram showing an illustrative routine for generating resources in a secured network.
Figure 5:
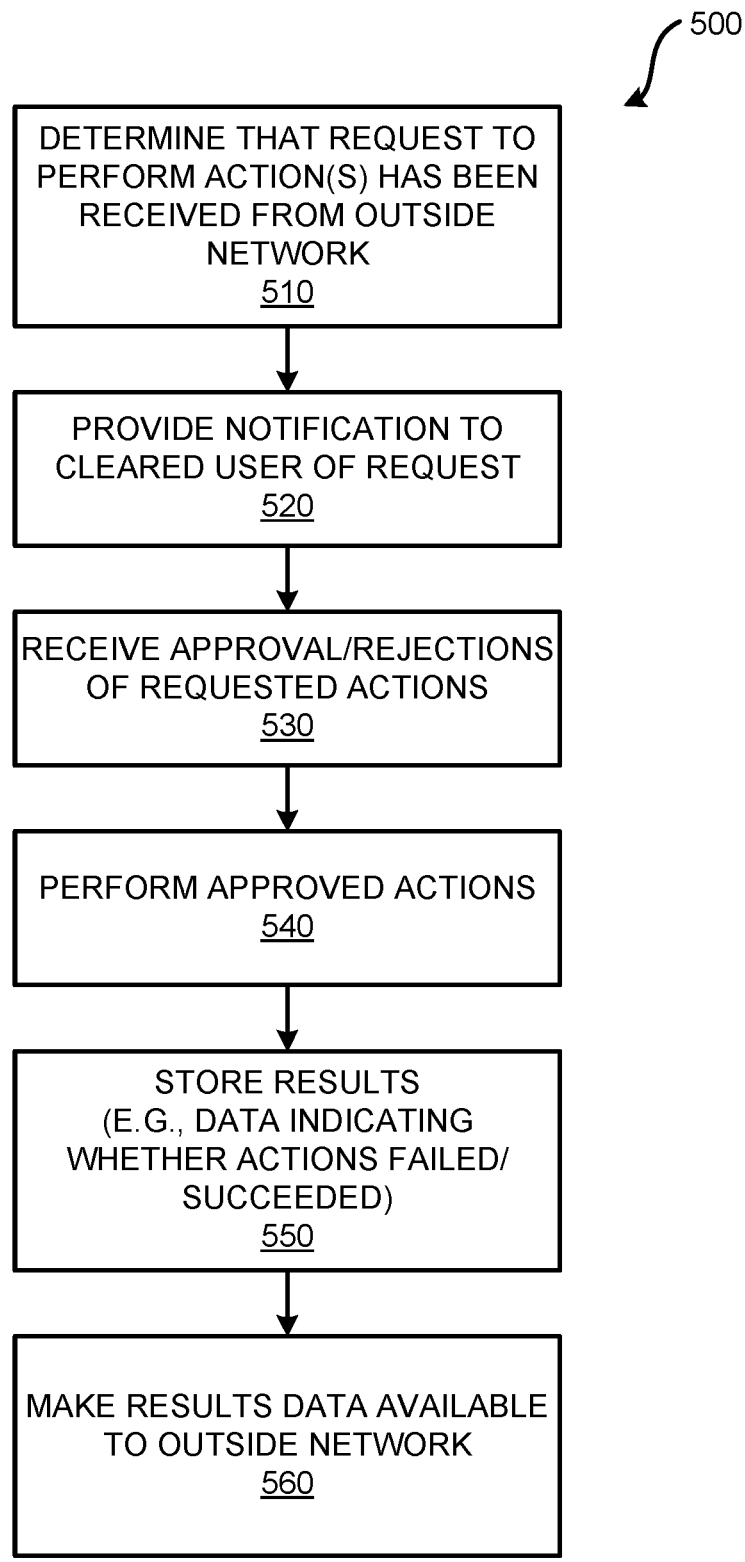
FIG. 5 is a flow diagram showing an illustrative routine for performing authorized actions within a secured network.

FIGS. 4 and 5 are flow diagrams showing illustrative routines 400 and 500, respectively, for generating resources in a secured network, according to examples disclosed herein. It should be appreciated that the logical operations described herein with respect to FIG. 4, FIG. 5, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

FIG. 4 is a flow diagram showing an illustrative routine 400 for generating resources in a secured network. At 410, a user 122B identifies resources to generate/actions to perform. As discussed above, a user 122B that is associated with the outside network 102A identifies the actions to perform (e.g., generating resources) within a network, such as the outside network 102A and/or the secured network 102B. According to some examples, the user 122B may utilize a UI 140A to specify the actions to perform and also to identify the network to perform the actions. For instance, the user 122B may use the UI 140A to indicate to perform the actions in the secured network 102B that the user 122B is not authorized to perform actions in.

At 420, a resource file is generated. As discussed above, the resource service 130 may generate a resource file in response to the user 122B indicating to perform actions within a network. In some configurations, the resource service 130 generates a same resource file whether the actions are to be performed within the outside network 102A or the secured network 102B. As discussed above, the resource file includes actions/commands to create resources (e.g., disk storage, virtual machines, . . . ) within a network, change parameters of one or more resources, test an operation of one or more resources, query one or more resources, and the like. The resource file may include/reference source code, actions to perform, what network to perform the actions in, and the like.

At 430, a decision is made as to whether the requested actions are to be performed within the secured network 102B, or a different network, such as the outside network 102A. As discussed above, the resource service 130 may identify that the user 122B identified the secured network 102B or that the user 122B identified the outside network 120A. When a secured network 102B has not been identified, the routine flows to 440. When the identified network is not a secured network 102B, the routine moves to 450.

At 440, the one or more actions are executed within the identified outside network 102A. As discussed above, the resource service 130 may access data, such as data associated with the resource file, and/or other data, to determine what actions to perform.

At 450, the resource file is stored in a data store that is accessible by the secured network. As discussed above, the resource service 130 may store the resource file in a data store 150A within the outside network 102A that triggers an event that indicates that a user 122A has requested to perform actions within the secured network 102B.

At 460, the resource file 152A is transferred to the secured network 102B. As discussed above, the transfer service 160 is triggered to transfer the resource file 152A to the secured network 102B based on the resource service 130A storing the resource file 152A in the data store 150A. In some configurations, the resource file 152A is transferred and stored in data store 150B of the secured network 102B as resource file 152B. In some configurations, one or more of the requested actions may be adjusted by the transfer service 160 based on a configuration of the secured network 102B. For instance, the transfer service 160 may adjust one or more parameters of a requested action such that the requested action executes properly in the secured network 102B.

At 470, the authorized actions are performed within the secured network 102B. As discussed above, and in more detail below with regard to FIG. 5, the cleared user 122B authorizes the actions to be performed within the secured network 102B. IN some examples, the cleared user 122B utilizes a GUI 140B that allows the cleared user 122B to approve/reject requested actions to perform within the secured network 102B.

At 480, results are provided to the outside network 102B. As discussed above, results data generated from performing the authorized actions within the secured network may be transmitted/transferred to the outside network 102A such that the user 122A, or some other user, may view the results (e.g., success/failure/error codes, . . . ) from performing the actions within the secured network 102B without having to manually contact the cleared user 122B to discuss the results.

FIG. 5 is a flow diagram showing an illustrative routine 500 for performing authorized actions within a secured network, according to examples disclosed herein.

The routine 500 begins at 510, where a determination is made that identifies that a request to perform action(s) within the secured network 102B has been requested from an outside network 102A. As discussed above, a user 122A that is not authorized to perform actions within the secured network 102B may request one or more actions to perform within the secured network. In some configurations, the resource service 130B determines that a request has been made based on the resource file 152 being stored within a designated memory, such as data store 150B.

At 520, a notification may be provided to a cleared user 122B. As discussed above, the notification may be an electronic message that includes information that may be used by the cleared user to approve/reject the requested actions.

At 530, approval/rejection of requested actions are received from the cleared user 122B. As discussed above, the resource service 130B, or some other device or component, may cause a GUI 350 to be presented such that the cleared user 122B may easily approve/reject the requested actions to perform. In some configurations, one or more of the requested actions may be automatically authorized by the cleared user 122B.

At 540, the approved actions are performed. As discussed above, the resource service 130B may perform the approved actions and update data indicating that the approved action has been performed or not performed.

At 550, results of performing the approved actions are stored. As discussed above, the results may include detailed information about performance of the actions and/or less detailed information such as but not limited to an indication of whether the action was successful, unsuccessful, one or more error codes, and the like.

At 560, the results are made available to the outside network. As discussed above, the resource service 130B may store the results within a data store 150B that triggers the transfer service 160 to transfer the results to the data store 150A.

Figure 6:
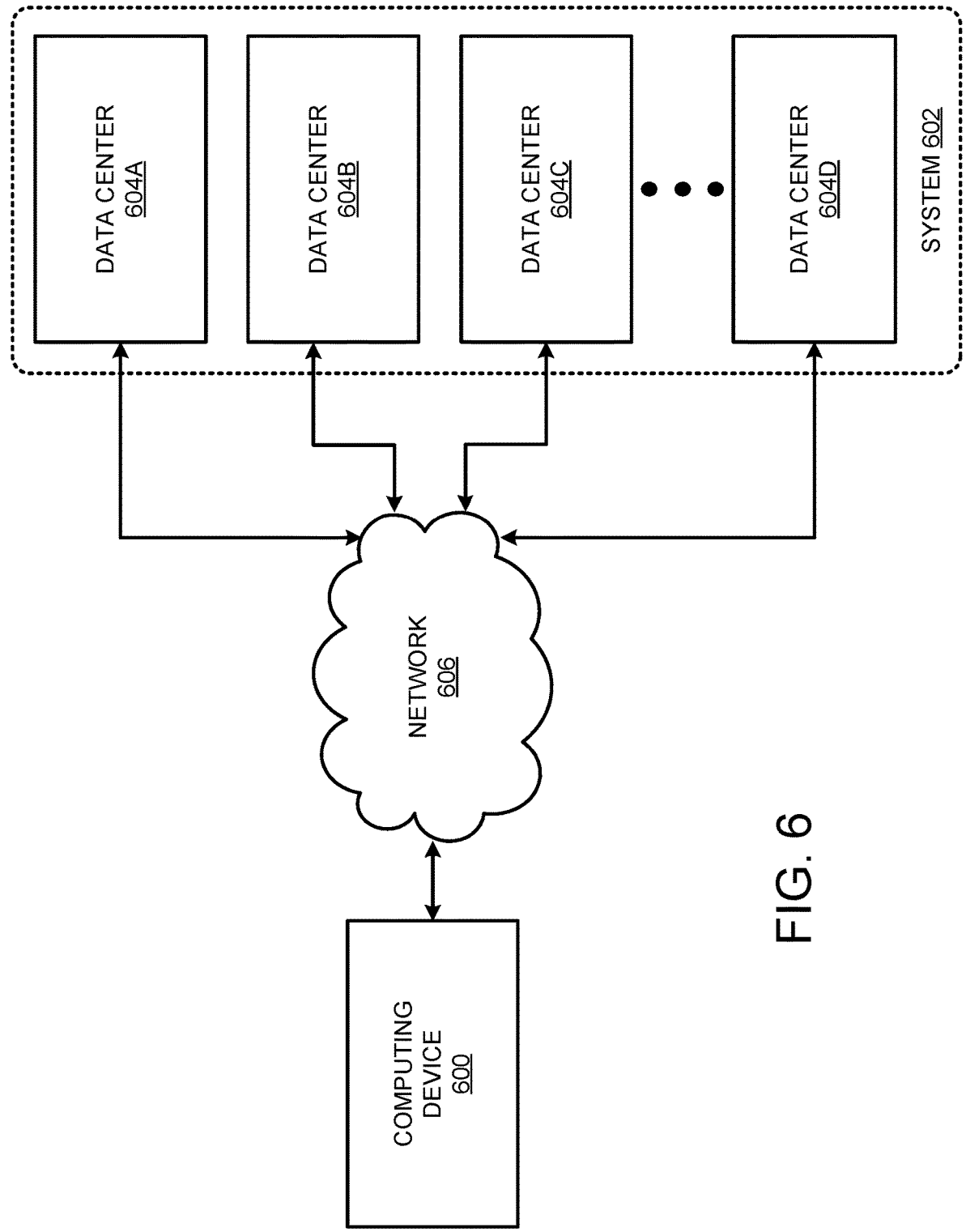
FIG. 6 is a system and network diagram that shows an illustrative operating environment including several data centers that can be configured to implement aspects of the functionality described herein.

FIG. 6 is a system and network diagram that shows an illustrative operating environment for the configurations disclosed herein that includes a system 602 that can be configured to provide the functionality described above. As discussed above, the system 602 can execute network services that provide computing resources for implementing the functionality disclosed herein. The computing resources implemented by the system 602 can be data processing resources, such as virtual machine ("VM") instances, data storage resources, networking resources, data communication resources, network services, and other types of resources.

The computing resources utilized can be general-purpose or can be available in a number of specific configurations. For example, data processing resources can be available as physical computers or VM instances in a number of different configurations. The VM instances can be configured to execute applications, including web servers, servers, media servers, database servers, some or all of the network services described above, and/or other types of programs. Data storage resources can include file storage devices, block storage devices, and the like. The system 602 can also include and utilize other types of computing resources not mentioned specifically herein.

As also discussed above, the computing resources provided by the system 602 are enabled in one implementation by one or more data centers 604A-604D (which might be referred to herein singularly as "a data center 604" or collectively as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative configuration for a data center 604 that can be utilized to implement the technologies disclosed herein will be described below with regard to FIG. 8.

The users can access the services provided by the system 602 over a network 606, which can be a wide area communication network ("WAN"), such as the Internet, an intranet or an Internet service provider ("ISP") network or a combination of such networks. For example, and without limitation, a computing device 600 operated by a user or other user of the system 602, such as the computing device 114, can be utilized to access the system 602 by way of the network 606. It should be appreciated that a local-area network ("LAN"), the Internet, or any other networking topology known in the art that connects the data centers 604 to remote users and other users can be utilized. It should also be appreciated that combinations of such networks can also be utilized.

Figure 7:
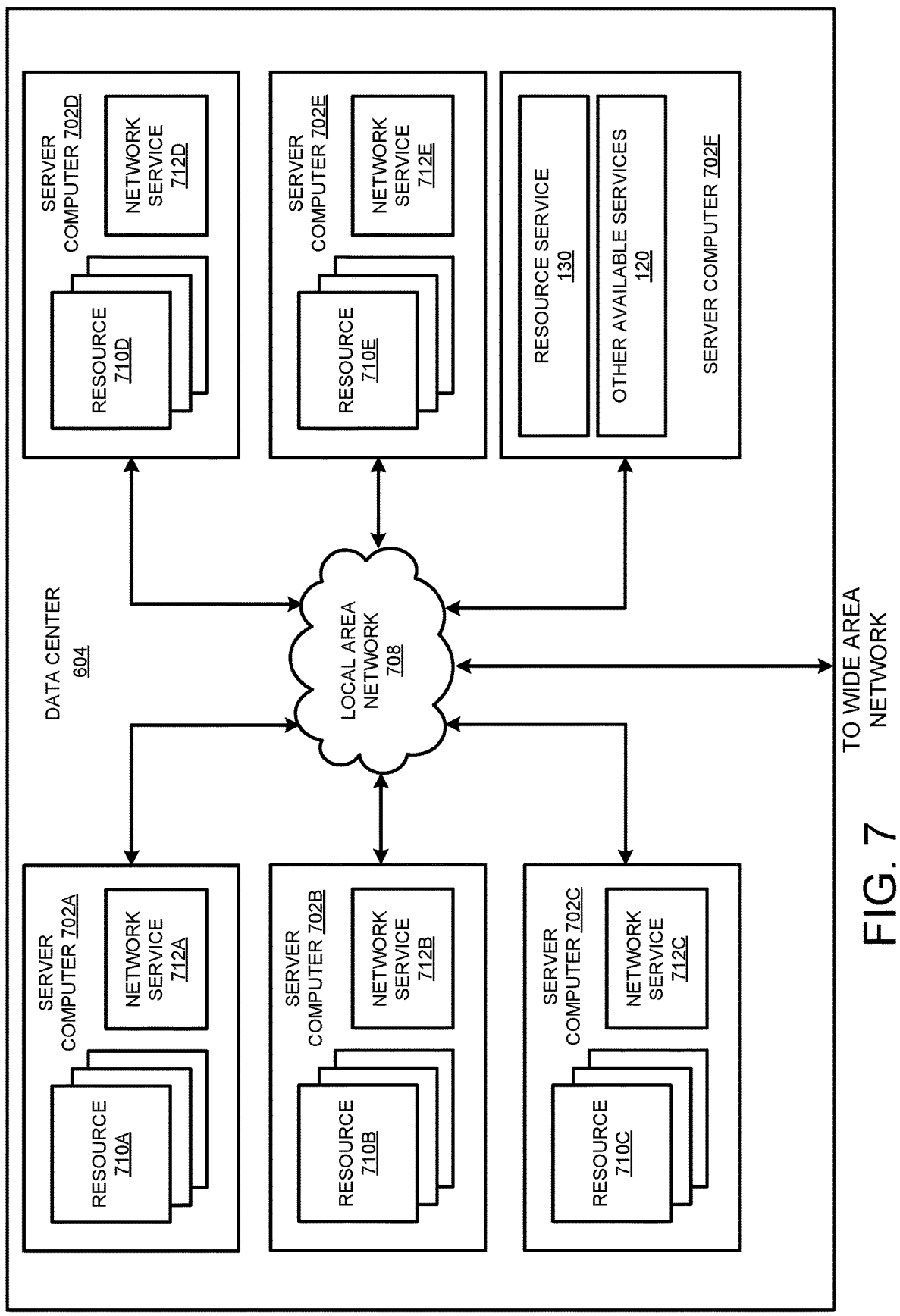
FIG. 7 is a computing system diagram illustrating a configuration for a data center that can be utilized to implement aspects of the technologies disclosed herein.

FIG. 7 is a computing system diagram that illustrates examples for a data center 604 that can be utilized to implement the resource service 130, other available services 120, and the other functionality disclosed herein. The example data center 604 shown in FIG. 7 includes several server computers 702A-702F (which might be referred to herein singularly as "a server computer 702" or in the plural as "the server computers 702").

The server computers 702 can be standard tower, rack-mount, or blade server computers configured appropriately for providing various types of computing resources 710 for implementing the functionality disclosed herein. As mentioned above, the computing resources 710 provided by the data center 604 can be data processing resources such as VM instances or hardware computing systems, data storage resources, database resources, networking resources, and others. Some of the servers 702 can also be configured to execute network services 712A-712-E, respectively, capable of instantiating, providing and/or managing the computing resources 710A-710E.

The data center 604 shown in FIG. 7 also includes a server computer 702F that can execute some or all of the software components described above. The server computer 702F can also be configured to execute other components and/or to store data for providing some or all of the functionality described herein. In this regard, it should be appreciated that components or different instances of the services can execute on many other physical or virtual servers in the data centers 604 in various configurations.

In the example data center 604 shown in FIG. 7, an appropriate LAN 708 is also utilized to interconnect the server computers 702A-702F. The LAN 708 is also connected to the network 602 illustrated in FIG. 6. It should be appreciated that the configuration of the network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604D, between each of the server computers 702A-702F in each data center 604, and, potentially, between computing resources 710 in each of the data centers 604. It should be appreciated that the configuration of the data center 604 described with reference to FIG. 7 is merely illustrative and that other implementations can be utilized.

Figure 8:
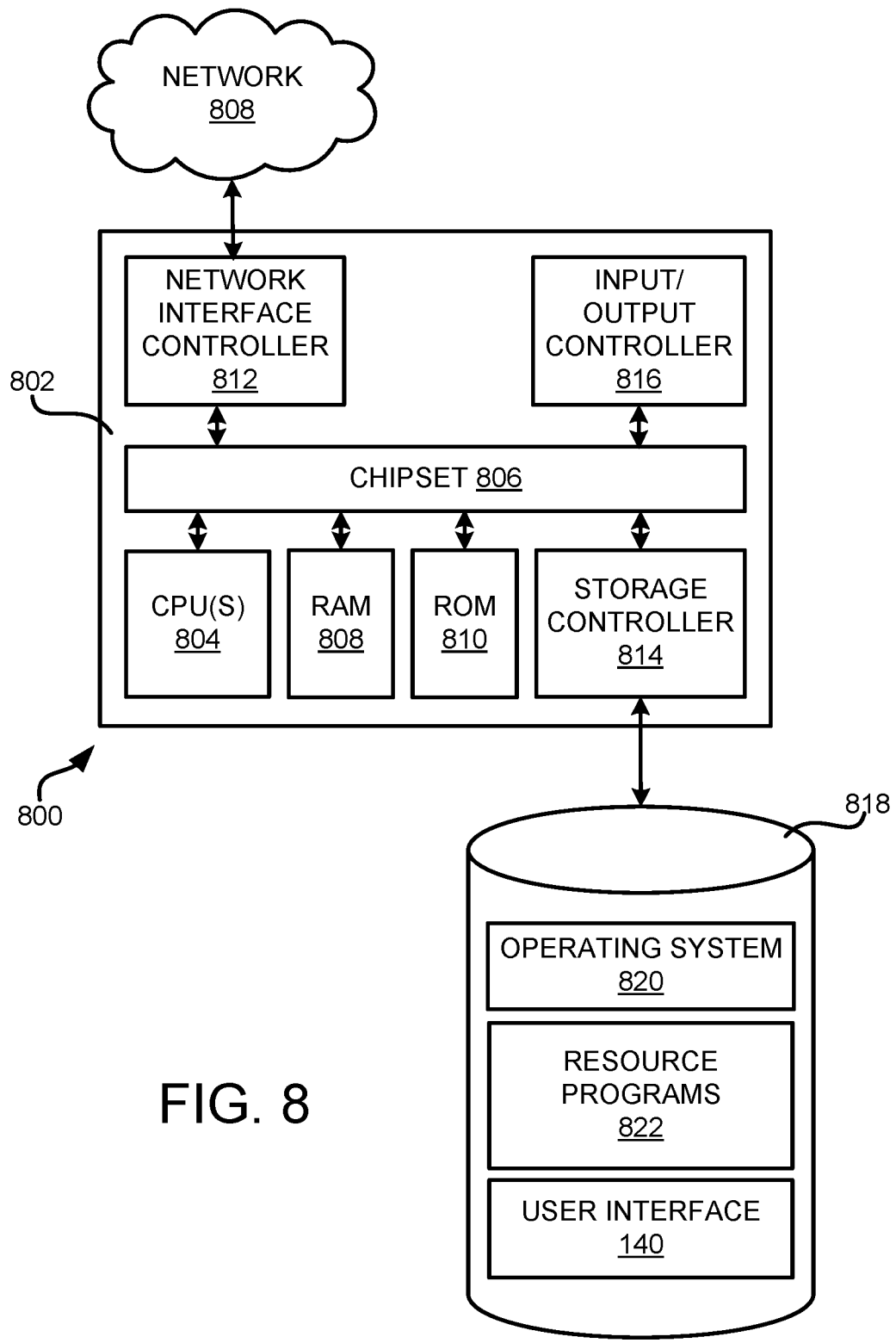
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 808. The chipset 806 can include functionality for providing network connectivity through a NIC 812, such as a gigabit Ethernet adapter. The NIC 812 is capable of connecting the computer 800 to other computing devices over the network 808. It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, resource programs 822 for providing functionality associated with the network 102, user interface 140, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to examples, the operating system comprises the LINUX operating system or one of its variants. According to another configuration, the operating system comprises the WINDOWS® SERVER operating system from MICROSOFT Corporation. According to further configurations, the operating system can comprise the UNIX operating system or one of its variants. It should be appreciated that other operating systems can also be utilized. The mass storage device 818 can store other system or application programs and data utilized by the computer 800.

In examples, the mass storage device 818 or other computer-readable storage media is encoded with computer-executable instructions which, when loaded into the computer 800, transform the computer from a general-purpose computing system into a special-purpose computer capable of implementing the configurations described herein. These computer-executable instructions transform the computer 800 by specifying how the CPUs 804 transition between states, as described above. According to examples, the computer 800 has access to computer-readable storage media storing computer-executable instructions which, when executed by the computer 800, perform the various processes described above with regard to FIGS. 1-8. The computer 800 can also include computer-readable storage media for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or can utilize an architecture completely different than that shown in FIG. 8.

Based on the foregoing, it should be appreciated that technologies for generating resources in a secured network have been described herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system comprising:
one or more computers of an outside network, wherein the one or more computers include one or more processors; and
a non-transitory computer-readable storage medium having instructions stored thereupon which, when executed by the one or more processors, cause the one or more computers of the outside network to:
receive a request from a computing device associated with a user to generate resources within a network;
determine that the network is a secured network that is secured and isolated from the outside network and the computing device and that the user is unauthorized to access the secured network;
based on determining that the network is the secure network that the user is unauthorized to access, generate a resource file that indicates actions to perform within the secured network to generate the resources;
store the resource file within a first data store of the outside network;
cause, based on the resource file being stored within the first data store, an electronic message to be transmitted to a cleared user of the secured network, wherein the electronic message requests the cleared user to authorize the actions to be performed within the secured network;
cause the resource file to be transferred from the first data store of the outside network to a second data store of the secured network;
cause the actions to be executed within the secured network based on an authorization received from the cleared user;
access results generated in response to execution of the actions; and
provide, for display within a graphical user interface (GUI) of the computing device, the results that indicate successful actions executed within the secured network and unsuccessful actions executed within the secured network.

2. The system of claim 1, wherein the instructions further cause the system to:
cause a second GUI to be presented for display to the cleared user, wherein the second GUI includes user interface (UI) elements to approve or reject each of the actions; and
determine the actions to be executed within the secured network based on selections made to the second GUI by the cleared user.

3. The system of claim 2, wherein the electronic message includes a link that, when selected, causes a display of the second GUI such that the cleared user may approve or reject each of the actions.

4. The system of claim 1, wherein the instructions further cause the system to transmit a second message to the user that indicates the results are available to view and causing the results to be provided.

5. A computer-implemented method comprising:
detecting an event that indicates a request from a first computing device associated with a first user of a first network to perform one or more actions to generate one or more resources within a second network;
determining that the second network is secured and isolated from the first network and that the first user is unauthorized to perform the one or more actions within the second network; and
based at least in part on determining that the second network is secured and isolated from the first network and that the first user is unauthorized to perform the one or more actions within the second network:
accessing data received from the first network indicating the one or more actions to perform within the second network;
causing at least one of the one or more actions to be performed within the second network based at least in part on an authorization received from a second computing device associated with a second user that is authorized to perform the one or more actions within the second network; and
transmitting results to the first computing device associated with the first user.

6. The computer-implemented method of claim 5, further comprising causing the results to be displayed within a graphical user interface (GUI) of the first computing device associated with the first user of the first network.

7. The computer-implemented method of claim 5, further comprising transmitting, to the second computing device, a notification that requests the authorization, wherein the notification includes a link that, when selected by the second user, display the one or more actions requested to be performed within the second network.

8. The computer-implemented method of claim 5, wherein the request to perform the one or more actions within the second network includes data that indicates the one or more resources to generate within the second network.

9. The computer-implemented method of claim 5, wherein detecting the event comprises determining that a resource file is stored within a data store that is accessible to the second network, wherein the resource file includes an identification of the one or more actions.

10. The computer-implemented method of claim 9, further comprising initiating a transfer of the resource file from the data store to a second data store within the second network based at least in part determining that the resource file is stored within the data store.

11. The computer-implemented method of claim 5, further comprising generating a request to perform the actions based at least in a part on a designation of the second network received from the first computing device associated with the first user of the first network.

12. The computer-implemented method of claim 11, further comprising providing, for presentation within a graphical user interface (GUI) one or more UI elements configured to:
provide an indication of the one or more of the actions to perform within the second network; and
receive one or more selections that indicate an approval of at least one of the one or more of the actions.

13. The computer-implemented method of claim 5, wherein accessing the data received from the first network comprises determining that the data is authorized to be transferred from the first network to the second network.

14. A system comprising:
one or more processors; and
a non-transitory computer-readable storage medium having instructions stored thereupon which, when executed by the one or more processors, cause the system to:
detect an event that indicates a request from a first computing device of a first user of a first network to perform one or more actions to generate one or more resources within a second network;
determine that the second network is secured and isolated from the first network and that the first user is unauthorized to perform the one or more actions within the second network; and
based at least in part on determining that the second network is secured and isolated from the first network and that the first user is unauthorized to perform the one or more actions within the second network:
access data received from the first network indicating the one or more actions to perform within the second network;
cause at least one of the one or more actions to be performed within the second network based at least in part on an authorization received from a second computing device associated with a second user that is authorized to perform the one or more actions within the second network; and
transmit results associated with execution of the at least one of the one or more actions within the second network to the first computing device associated with the first user.

15. The system of claim 14, wherein the instructions further cause the system to cause the results to be displayed within a graphical user interface (GUI) of the first computing device associated with the first user of the first network.

16. The system of claim 14, wherein the instructions further cause the system to transmit a notification to the second computing device associated with the second user that requests the authorization, wherein the notification includes a link, that when selected by the second user, displays the one or more actions requested to be performed within the second network.

17. The system of claim 14, wherein the request to perform the one or more actions within the second network includes data that indicates the one or more resources to generate within the second network.

18. The system of claim 14, wherein detecting the event comprises determining that a resource file is stored within a data store that is accessible to the second network, wherein the resource file includes an identification of the one or more actions.

19. The system of claim 18, wherein the instructions further cause the system to cause a transfer of the resource file from the data store to a second data store within the second network based at least in part determining that the resource file is stored within the data store.

20. The system of claim 15, wherein the instructions further cause the system to generate a request to perform actions based at least in a part on a designation of the second network received from the first computing device associated with the first user of the first network.

* * * * *